Sept. 20, 1971     F. H. SPECKHART     3,605,587

FRICTIONALLY HELD IMPACT TYPE SHUTTER

Filed July 3, 1968

INVENTOR
FRANK H. SPECKHART

BY

ATTORNEYS

United States Patent Office 3,605,587
Patented Sept. 20, 1971

3,605,587
FRICTIONALLY HELD IMPACT TYPE SHUTTER
Frank Henry Speckhart, Knoxville, Tenn., assignor to
Eastman Kodak Company, Rochester, N.Y.
Filed July 3, 1968, Ser. No. 742,385
Int. Cl. G03b 7/03, 9/10
U.S. Cl. 95—10C                                     3 Claims

ABSTRACT OF THE DISCLOSURE

In an automatic shutter control arrangement for a camera, the shutter is opened by an impact imparted by a spring loaded driver controlled by a shutter release lever. The shutter is held open by frictional engagement with an electromagnetic keeper device. Actuation of the shutter release lever also energizes a timing circuit which causes timed de-energization of the keeper device to release the shutter. A photosensitive device in the timing circuit controls the exposure time in accordance with the scene brightness.

BACKGROUND OF THE INVENTION

Field of the invention

The present invention relates to camera shutters and more particularly to automatically controlled camera shutters.

The prior art

Automatic shutters of prior art have been quite complicated as exemplified by U.S. Pat. 3,191,511, Burgarella et al., issued June 29, 1965. This type of prior art structure requires a great many parts and is therefore expensive to manufacture. Furthermore, a complicated structure is inherently not as reliable as a simpler structure.

SUMMARY OF THE INVENTION

The present invention provides a shutter arrangement for automatically controlling the open time of a camera shutter. Although the arrangement of the invention provides accurate control of the shutter speed, it is nonetheless relatively simple in construction and easy to maintain.

In accordance with a preferred embodiment of the invention, a shutter control arrangement is provided wherein an impact-actuated shutter is released from an open position by a scene-light controlled timing circuit. The shutter is held in the open position through frictional engagement with an electromagnetically controlled keeper device. The keeper device is de-actuated and the shutter released in response to a timed control signal from the timing circuit. The open time of the shutter is a function of the intensity of the scene lighting as determined by a photosensitive cell.

BRIEF DESCRIPTION OF THE DRAWINGS

Other features and advantages of the invention will be apparent to those skilled in the art from the following description of the drawings in which.

DESCRIPTION OF THE PREFERRED EMBODIMENT

Figure 1:
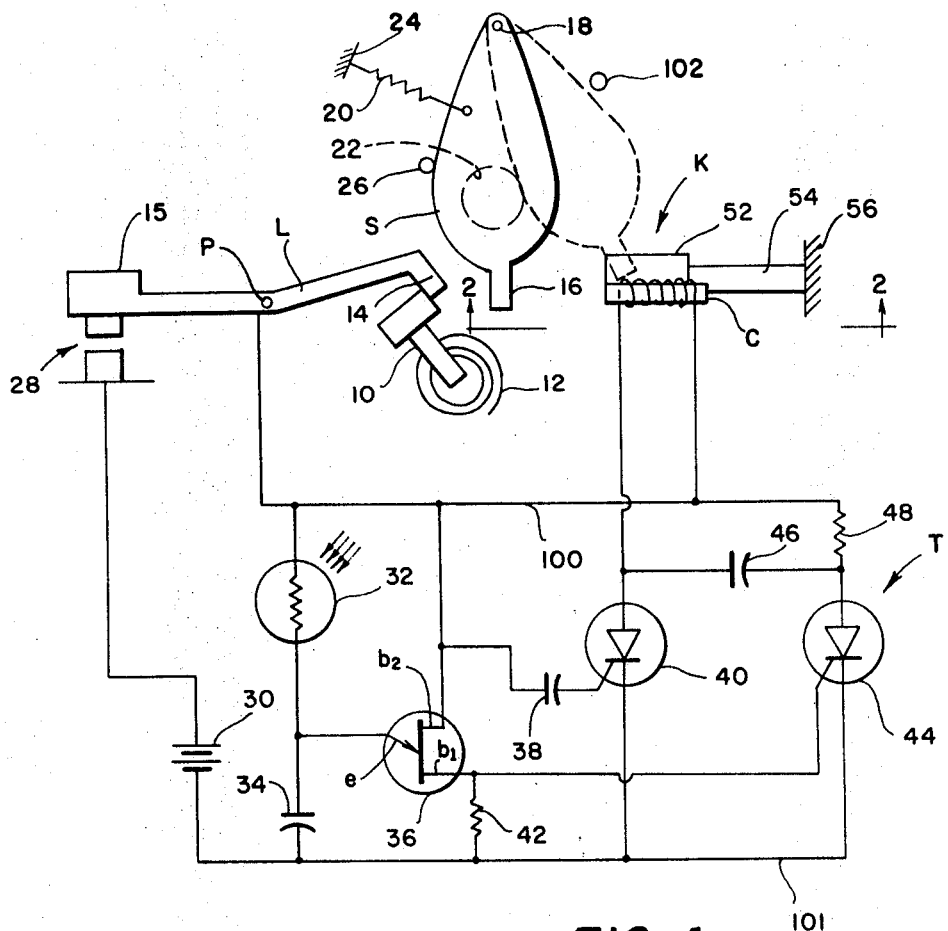
FIG. 1 is a schematic representation of a preferred embodiment of the shutter control of the present invention including the timing circuit therefor.

Referring to FIG. 1, there is shown a blade-type shutter S, the movement of which is controlled by a shutter driver 10. Driver 10 is biased by a coil spring 12 toward the shutter blade. Driver 10 is latched into an inoperative position by a latch member 14 formed on one end of a shutter release lever L which is pivoted at P. Release lever L may further include a push button actuator member 15 which when depressed causes pivoting of the lever L and the consequent unlatching of driver 10. The actuator for lever L may, of course, take other forms. Driver 10, when unlatched, strikes the edge of a flat tip member 16 extending outwardly from the lower portion of shutter S. Shutter S is pivoted at the upper end thereof about a pivot pin 18. A return spring 20 holds shutter S in the closed position thereof in which shutter S blocks a camera aperture 22 indicated in dashed lines in FIG. 1. Return spring 20 is affixed by suitable means to a portion of the camera housing 24. A stop 26 limits the travel of shutter S in the clockwise direction as shown.

Actuation of shutter release lever L also closes the contacts of a switch generally denoted 28 which controls energization of a timing circuit generally designated T.

Timing circuit T includes a unidirectional source of potential 30 connected in series with switch 28 and in parallel with the series combination of a photosensitive device 32 and a capacitor 34. Photosensitive device 32 may, for example, comprise a photoconductive cell such as a cadmium sulfide cell. The junction between photosensitive device 32 and capacitor 34 is connected to the emitter electrode of a uni-junction transistor (UJT) 36. The upper base electrode $b_2$ of UJT 36 is connected to one side of photosensitive device 32 and, through a coupling capacitor 38, to the control electrode of a silicon controlled rectifier (SCR) 40. The lower base electrode $b_1$ is connected to ground through resistor 42 and to the gate or control electrode of silicon controlled rectifier 44. The cathodes of silicon controlled rectifiers 40 and 44 are connected to ground. The anode of SCR 40 is connected to the anode of SCR 44 through a capacitor 46 and to one side of a holding coil generally denoted C. The anode of SCR 44 is further connected through a resistance 48 to a junction between capacitor 38 and the upper base $b_2$ of UJT 36 and to the other side of coil C.

Figure 2:
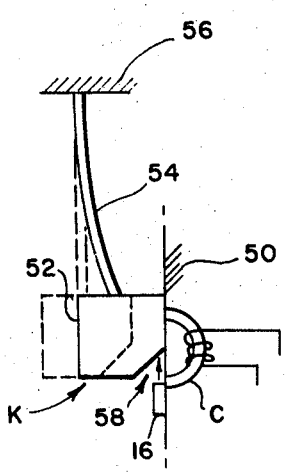
FIGS. 2-4 are representational views taken generally along line 2—2 of FIG. 1 showing the relative positions of the shutter and a keeper member during various stages of operation of the device of the invention.
Figure 3:
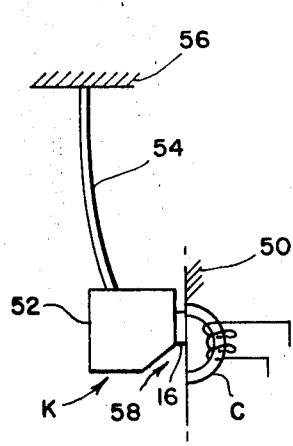
Figure 4:
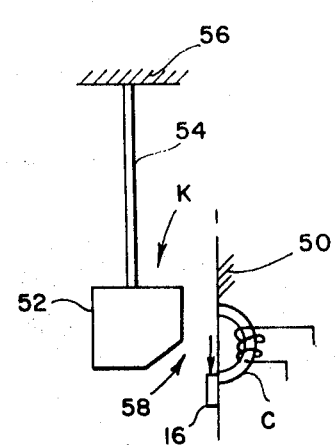

Holding coil C is mounted in a portion of a camera housing denoted 50 as shown in FIGS. 2 to 4. Coil C lies opposite housing 50 and faces an armature K. Armature K comprises a block of electromagnetic material 52 mounted at the end of a cantilever spring 54. One end of spring 54 is affixed to a portion of the camera housing denoted 56. Armature K includes a beveled portion which forms beveled guide slot 58 (FIGS. 2-4) between block 52 and the face of coil C.

In operation, actuation of the shutter control is begun by actuation of shutter release lever L. Depressing push button 15 on lever L causes both the unlatching of shutter driver 10 by latch 14 and the closing of switch 28.

Unlatching shutter driver 10 causes driver 10 to strike tip 16 of shutter S with an impact, provided by the release energy of coil spring 12, sufficient to cause pivoting of shutter S. Shutter S pivots about pivot pin 18 against the force of return spring 20 to a position wherein aperture 22 is no longer blocked. This position is indicated in dashed lines in FIG. 1. As will be described hereinbelow, tip member 16, under the impact of driver 10, will wedge itself between block 52 and the face of coil C as shown in FIG. 3.

As stated hereinbefore, energization of coil C is controlled by timing circuit T which is actuated by closing of switch 28. When switch 28 is closed, battery 30 is connected into the timing circuit. The instant that switch 28 is closed, the positive terminal of battery 30 is connected to positive bus bar 100. This causes a positive pulse to be coupled through capacitor 38 to the control electrode of SCR 40 thus turning it on. With SCR 40 conducting, an energizing circuit path for coil C is completed to negative bus 101. Energization of coil C causes attraction of block 52 which pivots against the bias of spring 54 to a position adjacent the face of coil C. Although block 52 and the face of coil C need not actually touch, the width of the opening or slot between them must be less than the width of shutter tip member 16 so that tip 16 may be captured and frictionally held therein (see FIGS. 2 and 3). Upon actuation of lever L, the tip member 16 will be driven into the beveled slot 58 and will separate keeper K from coil C by a wedging action. Tip member 16 will enter the opening created between coil C and keeper block 52 and will be held there by friction. This frictional engagement prevents shutter S from returning to its original position blocking aperture 22. Thus the shutter S will remain in the open position as long as coil C is energized.

Coil C is de-energized under the control of photoconductive cell 32. Scene light incident on photosensitive element 32 at the time of actuation of the shutter release lever L determines the value of resistance of cell 32 in a conventional manner. The value of resistance of cell 32 determines the charge rate of capacitor 34. Capacitor 34 begins to charge, simultaneously with the shutter sequence described hereinbefore, as soon as timing circuit T is energized. The capacitor 34 will charge up at a rate determined by the resistance of cell 32 to "stand-off" voltage of uni-junction transistor 36. When the capacitor has reached the firing potential of UJT 36, it will "fire," i.e., be rendered conductive. When UJT 36 conducts, the voltage on the control electrode of SCR 44 will be elevated and SCR 44 will be rendered conductive. When SCR 44 becomes conductive, its anode drops to almost ground potential. This drop in potential is coupled through capacitor 46 in the anode of SCR 40 thus turning it off. With SCR 44 conducting and SCR 40 nonconducting, the energizing circuit for coil C is open. As stated hereinabove, as soon as coil C is de-energized, shutter blade S will be released and returned to the closed position. In summary, the resistance value of cell 32 determined by the scene light incident thereon controls the open time of shutter S.

To briefly summarize the overall operation, actuation of release lever L causes initiation of movement of shutter S as well as energization of timing circuit T. Energization of timing circuit T causes energization of holding coil C. Coil C, when energized, attracts armature K so that at the end of its movement shutter S is wedged between keeper K and coil C and frictionally held there. The open time of shutter S is a function of scene illumination as determined by photoconductive cell 32 in circuit T. The resistance of cell 32 determines the time of application of a de-energizing signal for coil C. With coil C, de-energized shutter S is released and returns to the closed position thereof.

It should be noted that the lighting of the scene, i.e., scene illumination, may be high enough that the SCR 40 and the UJT 36 which controls SCR 44 will be rendered conductive at essentially the same time after the timing switch 28 is closed. Under these circumstances the armature K will remain separated from coil C and thus the shutter blade S will not be held open as described hereinbefore but will merely return under the influence of return spring 20 to the closed position. A stop 102 will limit the travel of shutter S when it is not trapped by the armature K. It will be appreciated that the exposure time of the shutter S is at a minimum under these circumstances and represents the highest shutter speed available.

It will be understood that the present invention is applicable generally to any type of device utilizing a shutter control for a light-admitting aperture such as still and motion cameras.

Various modifications of the illustrated embodiment shown and described are, of course, possible. For example, in the timing circuit switch 28 may be closed by movement of the shutter driver 10 or by the initial movement of the shutter blade S rather than by a portion of release lever L as shown. Similarly, opening of switch 28 may be accomplished by the return movement of the shutter blade S.

Although the invention has been described in detail with particular reference to a preferred embodiment thereof, it will be understood that variations and modifications can be effected within the spirit and scope of the invention as described hereinabove and as defined in the appended claims.

I claim:
1. A shutter mechanism for a camera including an exposure aperture, comprising:
  (a) a blade member movable between a blocking position and a light-admitting position with respect to the aperture;
  (b) a means for moving said blade member from its blocking position to its light-admitting position to initiate an exposure interval;
  (c) means including an electromagnetic transducer for engaging and frictionally retaining said blade member to hold said member in its light-admitting position when said transducer is energized;
  (d) first electric circuit means for controlling energization of said transducer, said circuit means including a first silicon controlled rectifier actuatable to effect energization of said transducer; and
  (e) second electric circuit means for controlling de-energization of said transducer, including a photoresponsive element and a capacitor for producing an output voltage that varies with time at a rate determined in accordance with the level of illumination incident on the photoresponsive element, and a voltage sensing switch means comprising a unijunction transistor and a second silicon controlled rectifier for de-energizing said transducer when the output voltage reaches a predetermined value.

2. A shutter mechanism for a camera including an exposure aperture, comprising:
  (a) a blade member movable between a blocking position and a light-admitting position with respect to the aperture;
  (b) means for moving said blade member from its blocking position to its light-admitting position to initiate an exposure interval;
  (c) frictional means for engaging said blade member, said frictional engaging means including:
    (1) an electromagnet,
    (2) a member formed of electromagnetic material, and
    (3) a cantilever spring supporting said electromagnetic member adjacent said electromagnet such that said electromagnetic member is attracted to a position in the path of said blade member when said electromagnet is energized to frictionally retain said blade member between said electromagnetic member and said electromagnet, and
  (d) electric circuit means including a photoresponsive element and connected with said electromagnet for selectively de-energizing said electromagnet to permit the return of said shutter member to its blocking position.

3. A shutter mechanism for a camera including an exposure aperture, comprising:
  (a) a blade member movable between a blocking position and a light-admitting position with respect to the aperture;
  (b) means for moving said blade member from its blocking position to its light-admitting position to initiate an exposure interval;

(c) frictional means for engaging said blade member, said frictional engaging means including:
   (1) an electromagnet,
   (2) a member formed of electromagnetic material, and
   (3) a cantilever spring supporting said electromagnetic member adjacent said electromagnet such that said electromagnetic member is attracted to a position in the path of said blade member when said electromagnet is energized to retain said blade member between said electromagnetic member and said electromagnet frictionally, and (d) electric circuit means including a photoresponsive element and connected with said electromagnet for selectively disengaging said engaging means to permit the return of said shutter member to its blocking position, said electric circuit means including a capacitor in series with said photoresponsive element for producing an output voltage that varies with time at a rate determined in accordance with the level of light incident on said photoresponsive element, and a voltage sensing switch means connected with the junction between said capacitor and photoresponsive element for sensing the voltage at that junction, said switch means being connected with said electromagnet for de-enerigizing said electromagnet when the output voltage reaches a predetermined value.

References Cited

UNITED STATES PATENTS

| | | | |
|---|---|---|---|
| 2,953,983 | 9/1960 | Larson | 95—63 |
| 3,349,678 | 10/1967 | Suzuki et al. | 95—53X |
| 3,412,660 | 11/1968 | Wasielewski | 95—59X |
| 3,478,664 | 11/1969 | Jones | 95—53(elex)X |

SAMUEL S. MATTHEWS, Primary Examiner

M. L. GELLNER, Assistant Examiner

U.S. Cl X.R.

95—59